United States Patent
Wagner et al.

(10) Patent No.: US 6,937,160 B2
(45) Date of Patent: Aug. 30, 2005

(54) SENSOR ARRANGEMENT FOR APPLICATION TO AT LEAST ONE DATA ITEM

(75) Inventors: Dietmar Wagner, Kirchheim/Teck (DE); Ralf Medow, Esslingen (DE)

(73) Assignee: Festo AG & Co., Esslingen (DE)

( * ) Notice: Subject to any disclaimer, the term of this patent is extended or adjusted under 35 U.S.C. 154(b) by 594 days.

(21) Appl. No.: 10/004,099

(22) Filed: Oct. 31, 2001

(65) Prior Publication Data

US 2002/0075162 A1 Jun. 20, 2002

(30) Foreign Application Priority Data

Nov. 2, 2000 (DE) .......................................... 100 54 288

(51) Int. Cl.[7] .......................... G08C 19/22; H04Q 9/00
(52) U.S. Cl. .............................. 340/870.07; 340/310.08
(58) Field of Search .......................... 340/870.07, 517, 340/870.16, 310.06, 310.07, 310.08; 702/183

(56) References Cited

U.S. PATENT DOCUMENTS

| | | | | |
|---|---|---|---|---|
| 3,978,461 A | * | 8/1976 | DeLime, III | ................ 340/517 |
| 4,845,649 A | | 7/1989 | Eckardt et al. | |
| 5,355,129 A | | 10/1994 | Baumann | |
| 5,365,768 A | | 11/1994 | Suzuki et al. | |
| 5,434,774 A | * | 7/1995 | Seberger | ..................... 700/67 |
| 5,549,137 A | * | 8/1996 | Lenz et al. | .................. 137/486 |
| 5,995,021 A | * | 11/1999 | Kogure | ................... 340/870.02 |
| 6,017,143 A | * | 1/2000 | Eryurek et al. | ................ 700/51 |
| 6,246,968 B1 | | 6/2001 | Wilczek et al. | |
| 6,629,059 B2 | * | 9/2003 | Borgeson et al. | ........... 702/183 |
| 6,703,942 B1 | * | 3/2004 | Borelli et al. | ............ 340/870.3 |

FOREIGN PATENT DOCUMENTS

| | | |
|---|---|---|
| DE | 31 16690 A1 | 11/1982 |
| DE | 3318977 A1 | 11/1984 |

\* cited by examiner

*Primary Examiner*—Timothy Edwards, Jr.
(74) *Attorney, Agent, or Firm*—Hoffmann & Baron, LLP

(57) ABSTRACT

A sensor arrangement for application to at least one data item, and comprising at least one sensitive element connected by way of sensor electronic circuitry having a storage arrangement with an input/output port. This input/output port of the sensor arrangement is able to be connected by a line arrangement having at least three lines, with an external electrical or electronic device with an external electrical device, two lines being adapted for use as power supply lines and at least one third line being adapted for the transmission of sensor signals to the electrical device. By way of an external parametrization means, able to be connected with the at least one sensor signal line, parametrization signals may be supplied to the sensor electronic circuitry in order to parametrize the sensor arrangement by the storage of parametrization values. Accordingly sensor arrangement may be parametrized or re-parametrized fitting without any additional line or wireless transmission path being necessary.

25 Claims, 1 Drawing Sheet

SENSOR ARRANGEMENT FOR APPLICATION TO AT LEAST ONE DATA ITEM

BACKGROUND OF THE INVENTION

The invention relates to a sensor arrangement for application to at least one data item, comprising a line arrangement having at least three lines, by means of which the sensor arrangement may be connected with an external electrical device, two lines being adapted for use as power supply lines and at least one third line being adapted for the transmission of sensor signals to the electrical device.

There is frequently a requirement for setting or changing the sensor properties of such sensor arrangement even after installation on site or to be able to adapt the sensor arrangement to changed conditions. It is more especially in the case of sensors with a overall small size that a separate electrical connection for such parametrization is not possible and a cable-free connection with a electronic parametrization equipment by way of radio, infrared transmission or the like is impossible owing to lack of space and because of prohibitive costs.

SHORT SUMMARY OF THE INVENTION

One object of the invention is accordingly to preset or modify sensors in the case of sensor arrangements with an extremely small overall size without this involving a major modification of the hardware of the sensor arrangement.

In order to achieve these and/or other objects appearing from the present specification, claims and drawings, the present invention provides a sensor arrangement for application to at least one data item, comprising at least one sensitive element connected by way of sensor electronic circuitry having a storage arrangement with an input/output port, a line arrangement having at least three lines, by means of which the sensor arrangement may be connected with an external electrical or electronic device, two lines being adapted for use as power supply lines and at least one third line being adapted for the transmission of sensor signals to the electrical device, and by way of an external parametrization means, able to be connected with the at least one sensor line, parametrization signals may be supplied to the sensor electronic circuitry in order to parametrize the sensor arrangement by the storage of parametrization values.

There is then the advantage that the at least one sensor signal line, which is in any case present, may be used for parametrization as well so that no additional connection lines or wireless transmission means are necessary. An external parametrization means may, in case of need, be connected with the at least one sensor signal line and parametrization signals may be transmitted, derived parametrization data then being stored in the sensor arrangement. Furthermore, a modifications of the sensor properties can be readily performed later.

The features recited in the claims represent advantageous forms of the invention and also further possible improvements in the sensor arrangement In the case of a simple, first design of the parametrization means same is designed in the form of an instructional or teach-in device for producing a transfer signal, by means of which the instantaneous data item is written to the storage means as a switch or threshold value, the parametrization means being in this case preferably designed as a simple short circuiting switch.

However, within the framework of a more elaborate design the parametrization means may be designed as the input module of the electronic device or as a separate parametrization device, preferably provided with a display and operating elements in order to implement more elaborate parametrization settings.

The parametrization means is preferably adapted for the transmission of parametrization signals such as the setting of switching points, sensor and/or switching functions, sensor and/or switching characteristics, switching times, sensor response thresholds, hysteresis factors or window functions.

The parametrization signals are preferably able to be generated as digital signal sequences and able to be used to modulate the respectively present sensor signals so that the transmission of sensor signals and parametrization signals may take place simultaneously.

In a preferred embodiment the sensor signals are present in the form of at least two different signal levels, the signal level of the modulated parametrization signals preferably being smaller than the sensor signal level so that for recognition of the sensor signal level they are negligible.

For the parametrization it is preferred to utilize a parametrization protocol operating alternatingly in both directions. It preferably includes a start bit able to be checked by the sensor circuitry, means being provided for maintaining the instantaneously present sensor signal during a set-recognition or detection time in order to prevent a change in the sensor signal level from taking place in the sensor signal level during the start bit.

It is furthermore an advantage for the sensor electronic circuitry to include means for maintaining the instantaneously present sensor signal for a predetermined time during parametrization, such time being longer than a transmission cycle of the parametrization protocol. This means that a transmission cycle is not influenced by a change in the sensor signal in an improper manner.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
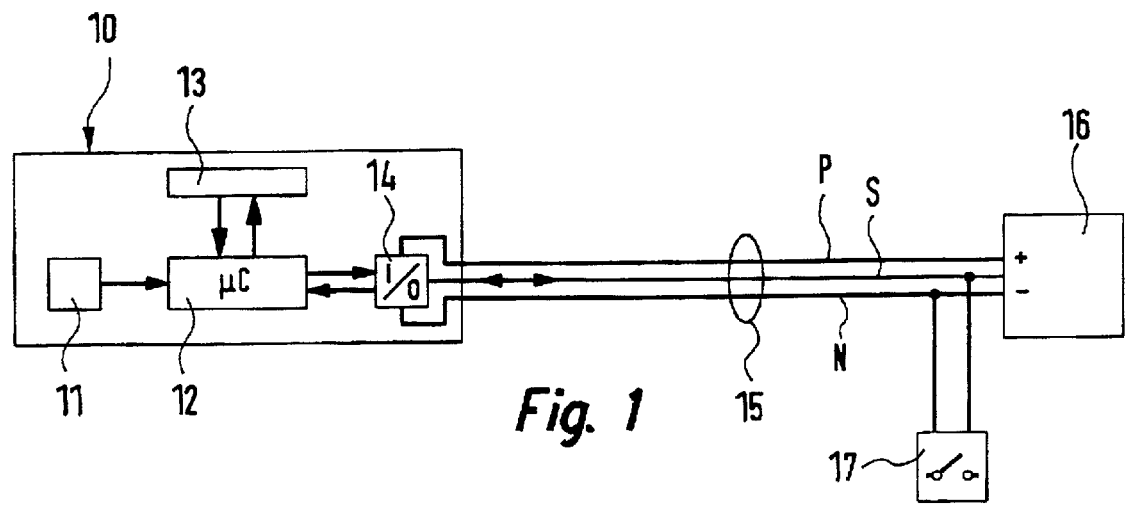
FIG. 1 is a diagrammatic representation of a sensor arrangement connected with a electrical device and having a short circuiting switch for teach-in parametrization.

As shown in FIG. 1 a sensor arrangement 10 comprises a sensor element 11, which is for instance a hall element, a field plate, a photosensitive element, a piezo element, a temperature responsive element, a pressure sensitive element, a power responsive element or the like.

This sensor element is connected with sensor electrical circuitry 12 here in the form of a microcomputer and which for its part is connected with a storage or memory arrangement 13 and an input/output port 14. The latter is connected by way of a line arrangement 15, which comprises three lines P, S and N, and represents the sensor connection lead, with an electrical or electronic device 16 which is supplied with sensor signals for controlling, regulating and/or display purposes. The line arrangement 15 comprises two power supply lines PN and furthermore a sensor signal line S, although a larger number of sensor signal lines could be present. The two power supply lines PN serve for power supply to the input/output port 14 and to other electronic components of the sensor arrangement 10. The sensor signal line S is connected by way of a short circuit switch 17 or a short circuit key with the power supply line N, and is for instance detachably connected therewith.

During normal operation the sensor signals produced in the sensor element 11 are processed in the sensor electronic circuitry 12 and fed by way of the input/output port 14 to the electrical device 16. In this case it is possible for a switching threshold value to be also stored in the storage arrangement 13 for the respectively detected or read data item, the sensor arrangement 10 producing a high signal at its output above the switching threshold value, whereas under such value a low signal is produced. Furthermore, using two signal threshold values it is also possible for a switching hysteresis effect to be produced.

For the storage of one or more switching threshold values in the storage arrangement 12 the short circuit switch 17 is provided as a teach in switch, which if required is able to be connected with the line arrangement 15 or can also be permanently connected there. If the instantaneously present data item is to be utilized as a switching threshold value, the short circuit switch 17 is operated. The short circuiting then occurring on operation of the sensor signal line S then taking place with the power supply line N is then detected by the sensor electronic circuitry and the corresponding data item is transferred to the storage arrangement 13 as a switching threshold value. In a corresponding manner it is possible furthermore for two data items to the transferred as switching threshold values for switching with a hysteresis effect, for instance by two sequentially occurring operations of the short circuiting switch 17.

Figure 2:
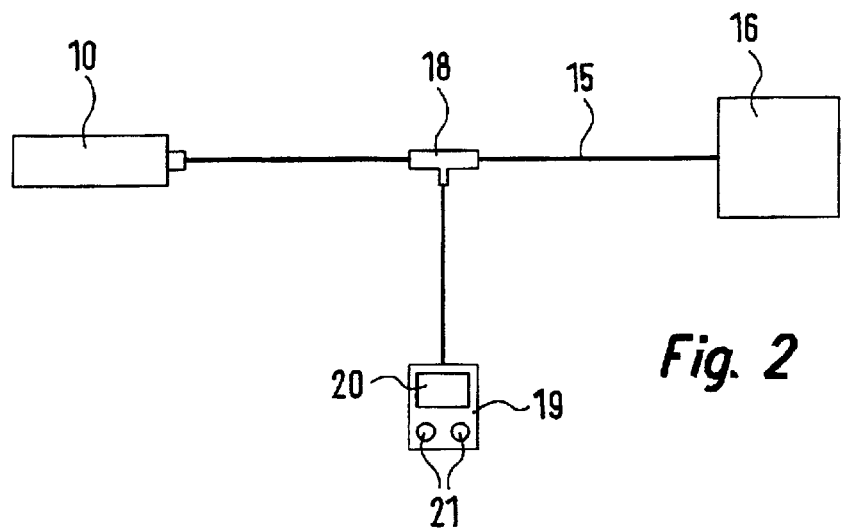
FIG. 2 shows the sensor arrangement connected with the electrical device by way of a line arrangement, such arrangement having a parametrization device connected with such line arrangement.

In the case of the second embodiment of the invention in FIG. 2 the sensor arrangement 10 and the electrical device 16 connected with same by way of the line arrangement 15 are similar, although the drawing is simplified. By way of a branch line 18 in the line arrangement 15 a parametrization device 19 is connected up, which possesses a display and operating elements 21. This parametrization device 19 may be connected with any point in the line arrangement 15 as example at the two end regions.

Figure 3:
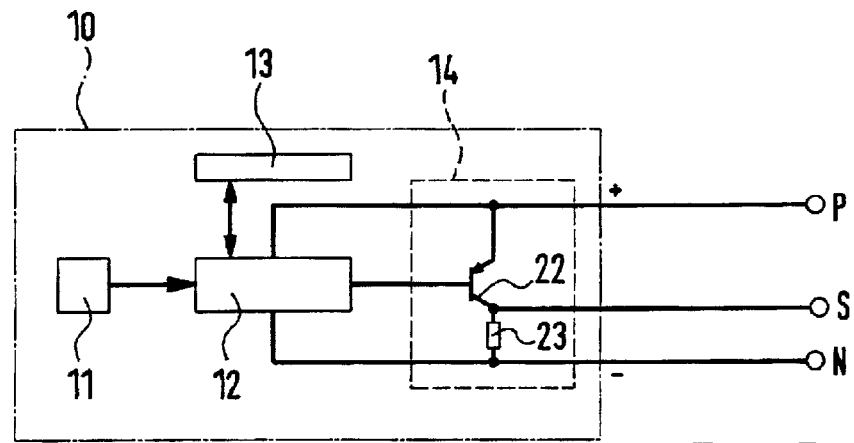
FIG. 3 shows a design of the circuit of the input/output port of the sensor arrangement.

The sensor arrangement 10 may for example be installed in a non-parametrized condition at the site of application. Parametrization can then take place using the parametrization 19. Furthermore, it is possible for the parametrization as originally entered or entered using the parametrization device 19 to be later changed. The course of parametrization is described in the following with reference to the sensor arrangement 10 as depicted in FIG. 3, in the case of which the input/output port 14 is in the form of a switching transistor 22, whose base is connected with one output of the sensor electronic circuitry 12, whose emitter is connected with the positive power supply line P and whose collector is connected by the resistor 23 with the negative power supply line N. The sensor signal line S is connected with the collector of such switching transistor 22.

Owing to the presence of the switching transistor 22 the sensor arrangement 10 has—dependent on the physical input quantity (data item)—two states at the output connected with the sensor signal line, namely on the one hand a potential near zero through the resistor 23 (output turned off) and on the other hand a potential below the plus potential (for instance 24V) by way of the turned on transistor (output switched on). These two states are interpreted in the electrical device 16 in such a manner that the data item is either below or above the switching threshold value.

Furthermore the parametrization device 19 connected with the line arrangement 15 accordingly recognizes the switching state of the sensor arrangement 10. Parametrization now takes place by the transmission of information bits to the sensor arrangement 10. In this case the potential is respectively increased by a voltage value of for instance 2 volts. The result is then four possible states of the sensor signal line S:

Output turned off parametrization signal low 0 volt
Output turned off parametrization signal high 0 volt
Output turned on parametrization signal low 22 volt
Output turned on parametrization signal high 24 volt The voltage level and the driver potentials in the parametrization device 19 and in the sensor arrangement 10 are so set that in all four states the normal function of the sensor arrangement 10 is ensured in connection with the load connected with same. This is particularly important in connection with digital SPS inputs. In this case the "off" state (data item below the switching threshold value) in the electrical device 16 is recognized at voltages less than 5 volt and the switching state of "on" (data item above the switching threshold value) is detected at voltages above 15 volt. The parametrization bits therefore are without any effect on the recognition of the switching state of the sensor arrangement 10 and, respectively, switching transistor 2.

On the transmission of the positive edge of the first parametrization bit (start of parametrization) the sensor arrangement 10 keeps its momentary state, and sort of freezes it. If the signal of the parametrization bit remains for a predetermined time at a stable level in the high state, the sensor arrangement will accept the parametrization start, and otherwise the sensor arrangement 10 will continue operating normally. The communication during parametrization may take place with a set protocol in both directions, the bit length being for example 0.5 ms and the word length being for instance 16 bits, the course of events being precisely set.

The set protocol for parametrization may be divided into transmission cycles, the sensor being able to change its switching state after each transmission cycle. The length of such cycle must be set and will normally amount to 1 to 2 ms for instance. The individual bits of the transmission may for instance be encoded over the voltage level with the same time base in the parametrization device 19 and in the sensor arrangement 10 (UART) or they may be set by the length of a parametrization pulse. In the case of the second possibility the time base may also less accurate and after each transmitted bit a switching state change may occur.

In order for the parametrization device 19 to be employed for all possible different sensor arrangements, communication must be defined for all such sensor arrangements uniformly. In the following the events in communication will be specified by way o example. In this case the parametrization device 19 is denoted by the acronym PG and the sensor arrangement by SA:

PG to SA parametrization start by first parametrization bit
SA to SG transmission of sensor identification
PG to SA first set parametrization value requested
SA to PG first parametrization value communicated and transmitted PG to SA second set parametrization value requested SA to PG second parametrization communicated and transmitted PG to SA new parametrization for first parametrization value transmitted (f. i. first switching threshold value)

SA to PG data item transmitted

PG to SA new parametrization for second parametrization value transmitted (f. i. second switching threshold value)

SA to PG data item transmitted

Parametrization may take in a number of different ways. In accordance with the above example switching threshold values were transmitted. Accordingly a sensor arrangement can also be parametrized by the transmission of other switching points, sensor and/or switching functions, sensor and/or switching characteristics, switching times, sensor response thresholds, hysteresis or window functions or the like. This will be dependent also on the type of sensor arrangement respectively utilized, since sensor arrangements for different data items also require different settings.

The above communication protocol can naturally be designed in many different ways and for instance data items which are more different or less different may be requested. It is also possible to completely halt transmission during parametrization or to freeze it at the respective data item.

The parametrization device 19 illustrated in the figure as a separate device can also for instance be integrated in the electrical device 16, as in an output module. For aiding parametrization it is the possible to use a display and operating controls as part of the electrical device. The electrical device 16 can be linked with a higher command level or by way of the Internet so that the sensor arrangement 10 can furthermore be parametrized by remote control. In the case of a design in the form of a separate device the parametrization device 19 may be removed for use for the parametrization of other sensors.

In an alternative design the parametrization device 19 may also be put on the sensor signal line S of the line arrangement 15. Then bidirectional communication may take place between the sensor arrangement 10 and the parametrization device 19 independently of the switching state of the switch arrangement 10 and the load. The sensor arrangement 10 in this case only has to be able to assume the switching states of "Vaus" (output turned off, potential near 0) and "Vein" (output turned on, potential below plus potential through a turned on transistor). Parametrization is then commenced by the parametrization device 19 and occasioned by a plus potential. The sensor arrangement 10 can detect this in the switching state Vaus owing to the voltage change at its output. In the Vein switching state it can detect by way of the output current whether an external plus potential has been switched to the output line. The recognition or detection of the output current is performed by way of an external shunt for instance. It is consequently possible for three regions for the layer current at the shunt to be distinguished:

Overload (current above, for example, 100 mA,

Normal operation or output turned on (current between for example 4 and 100 mA) and High ohmic load or parametrization (current below 4 mA).

Since accordingly the start of parametrization has thus been detected by the sensor arrangement 10, data will commenced with the parametrization device 19 by way of output line using the two switching states (Vaus and Vein). If the sensor arrangement 10 is receiving, the switching state will always be at 0 potential (Vaus). The parametrization device 19 passes on the switching state detected to the layer (for example 12 bit word length, 300 baud). Accordingly a switching state change is possible every 40 ms.

The invention is not restricted of the sensor arrangement with digital output signals and is in fact applicable to sensor arrangements having analog output signals. The transmission of the parametrization signals may for instance take place by modulation of such analog signals or during parametrization may be turned off or suppressed.

What is claimed is:

1. A sensor arrangement for application to at least one data item, comprising;

at least one sensitive element connected by way of sensor electronic circuitry having a storage arrangement with an input/output port, a line arrangement having at least three lines, by means of which the sensor arrangement may be connected with an external electrical or electronic device, two lines being adapted for use as power supply lines and at least one third line being adapted for the transmission of sensor signals to the electrical device, and by way of an external parametrization device, able to be connected with the at least one sensor line, parametrization signals may be supplied to the sensor electronic circuitry in order to parametrize the sensor arrangement by the storage of parametrization values, and wherein the parametrization device is adapted for the production of a transfer signal, by which the instantaneously present data item is taken over as at least one switching or threshold value in the storage arrangement, the parametrization device preferably being designed in the form of a teach in or short circuit switch.

2. The sensor arrangement as set forth in claim 1, wherein the sensor signals are digital signals in the form of at least two different signal levels.

3. The sensor arrangement as set forth in claim 1, wherein the parametrization device is in the form of an input module of the electronic device or as a separate parametrization device.

4. The sensor arrangement as set forth in claim 3, wherein the parametrization device is provided with a display and with operating controls.

5. The sensor arrangement as set forth in claim 3, wherein the parametrization device is adapted for the transmission of parametrization signals and more particularly for the setting of switching points, sensor and/or switching functions, sensor and/or switching characteristics, switching times, sensor response thresholds, hysteresis factors or window functions.

6. The sensor arrangement as set forth in claim 3, wherein the parametrization signals may be produced in the form of signal sequences and may be modulated onto the respectively present sensor signals.

7. The sensor arrangement as set forth in claim 6, wherein the signal level of the modulated parametrization signals is so much smaller than the sensor signals that they are negligible for the detection of the sensor signal levels.

8. The sensor arrangement as set forth in claim 3, wherein for parametrization a set parametrization protocol is utilized alternatingly changing over to one of two directions.

9. The sensor arrangement as set forth in claim 8, wherein the parametrization protocol includes one start bit able to be checked by the sensor electronic circuitry, means being provided for holding the instantaneous sensor signal for a set detection time.

10. The sensor arrangement as set forth in claim 8, wherein the sensor electronic circuitry includes means for holding the instantaneously existing sensor signal for a predetermined time during parametrization, such predetermined time being larger than a transmission cycle of the parametrization protocol.

11. A sensor arrangement for application to at least one data item, comprising:
at least one sensitive element connected by way of sensor electronic circuitry having a storage arrangement with an input/output port, a line arrangement having at least three lines, by means of which the sensor arrangement may be connected with an external electrical or electronic device, two lines being adapted for use as power supply lines and at least one third line being adapted for the transmission of sensor signals to the electrical device, and by way of an external parametrization device, able to be connected with the at least one sensor line, parametrization signals may be supplied to the sensor electronic circuitry in order to parametrize the sensor arrangement by the storage of parametrization values, and wherein the sensor signals are digital signals in the form of at least two different signal levels.

12. The sensor arrangement as set forth in claim 11, wherein the parametrization device is adapted for the production of a transfer signal, by which the instantaneously present data item is taken over as at least one switching or threshold value in the storage arrangement, the parametrization means preferably being designed in the form of a teach in or short circuit switch.

13. The sensor arrangement as set forth in claim 11, wherein the parametrization device is in the form of an input module of the electronic device or as a separate parametrization device.

14. The sensor arrangement as set forth in claim 13, wherein the parametrization device is provided with a display and with operating controls.

15. The sensor arrangement as set forth in claim 13, wherein the parametrization device is adapted for the transmission of parametrization signals and more particularly for the setting of switching points, sensor and/or switching functions, sensor and/or switching characteristics, switching times, sensor response thresholds, hysteresis factors or window functions.

16. The sensor arrangement as set forth in claim 13, wherein the parametrization signals may be produced in the form of signal sequences and may be modulated onto the respectively present sensor signals.

17. The sensor arrangement as set forth in claim 16, wherein the signal level of the modulated parametrization signals is so much smaller than the sensor signals that they are negligible for the detection of the sensor signal levels.

18. The sensor arrangement as set forth in claim 13, wherein for parametrization a set parametrization protocol is utilized alternatingly changing over to one of two directions.

19. The sensor arrangement as set forth in claim 18, wherein the parametrization protocol includes one start bit able to be checked by the sensor electronic circuitry, means being provided for holding the instantaneous sensor signal for a set detection time.

20. The sensor arrangement as set forth in claim 18, wherein the sensor electronic circuitry includes means for holding the instantaneously existing sensor signal for a predetermined time during parametrization, such predetermined time being larger than a transmission cycle of the parametrization protocol.

21. A sensor arrangement for application to at least one data item, comprising:
at least one sensitive element connected by way of sensor electronic circuitry having a storage arrangement with an input/output port, a line arrangement having at least three lines, by means of which the sensor arrangement may be connected with an external electrical or electronic device, two lines being adapted for use as power supply lines and at least one third line being adapted for the transmission of sensor signals to the electrical device, and by way of an external parametrization device, able to be connected with the at least one sensor line, parametrization signals may be supplied to the sensor electronic circuitry in order to parametrize the sensor arrangement by the storage of parametrization values, and wherein the parametrization device is in the form of an input module of the electronic device or as a separate parametrization device, and the parametrization signals are produced in the form of signal sequences and modulated onto the respectively present sensor signals.

22. The sensor arrangement as set forth in claim 21, wherein the signal level of the modulated parametrization signals is so much smaller than the sensor signals that they are negligible for the detection of the sensor signal levels.

23. A sensor arrangement for application to at least one data item, comprising:
at least one sensitive element connected by way of sensor electronic circuitry having a storage arrangement with an input/output port, a line arrangement having at least three lines, by means of which the sensor arrangement may be connected with an external electrical or electronic device, two lines being adapted for use as power supply lines and at least one third line being adapted for the transmission of sensor signals to the electrical device, and by way of an external parametrization device, able to be connected with the at least one sensor line, parametrization signals may be supplied to the sensor electronic circuitry in order to parametrize the sensor arrangement by the storage of parametrization values, and wherein the parametrization device is in the form of an input module of the electronic device or as a separate parametrization device, and for parametrization a set parametrization protocol is utilized alternatingly changing over to one of two directions.

24. The sensor arrangement as set forth in claim 23, wherein the parametrization protocol includes one start bit able to be checked by the sensor electronic circuitry, means being provided for holding the instantaneous sensor signal for a set detection time.

25. The sensor arrangement as set forth in claim 23, wherein the sensor electronic circuitry includes means for holding the instantaneously existing sensor signal for a predetermined time during parametrization, such predetermined time being larger than a transmission cycle of the parametrization protocol.

* * * * *